United States Patent [19]

Habermeier et al.

[11] 3,867,385

[45] Feb. 18, 1975

[54] BINUCLEAR N-HETEROCYCLIC POLYGLYCIDYL COMPOUNDS, PROCESSES FOR THEIR MANUFACTURE, AND THEIR USE

[75] Inventors: Jurgen Habermeier, Pfeffingen; Daniel Porret, Binningen, both of Switzerland

[73] Assignee: Ciba-Geigy Corporaton, Ardsley, N.Y.

[22] Filed: Nov. 21, 1972

[21] Appl. No.: 308,625

[30] Foreign Application Priority Data
Nov. 24, 1971 Switzerland.................... 17126/71

[52] U.S. Cl.......... 260/256.4 C, 260/2 EP, 260/2 N, 260/2 EA, 260/32.8 EP, 260/33.2 EP, 260/33.4 EP, 260/33.6 EP, 260/37 EP, 260/260, 260/309.5, 260/DIG. 24
[51] Int. Cl............................................. C07d 51/30
[58] Field of Search................... 260/309.5, 256.4 C

[56] References Cited
UNITED STATES PATENTS
3,679,681   7/1972   Habermeier et al.......... 260/256.4 C Primary Examiner—Donald G. Daus
Assistant Examiner—Raymond V. Rush
Attorney, Agent, or Firm—Vincent J. Cavalieri

[57] ABSTRACT

Diglycidyl and tetraglycidyl compounds are obtained by glycidylating diurethanes obtained from 1 mol of a diisocyanate and 2 mols of a 3-hydroxyalkylhydantoin or 3-hydroxyalkyldihydrouracil in a known manner with epichlorohydrin or $\beta$-methylepichlorohydrin. The new epoxide resins can be cured with the customary curing agents for epoxides to give moulded materials having valuable mechanical and dielectric properties and are above all suitable for use as powder resins, such as fluidized bed powders and compression moulding powders.

9 Claims, No Drawings

BINUCLEAR N-HETEROCYCLIC POLYGLYCIDYL COMPOUNDS, PROCESSES FOR THEIR MANUFACTURE, AND THEIR USE

The present invention relates to new, binuclear N-heterocyclic polyglycidyl compounds of the formula

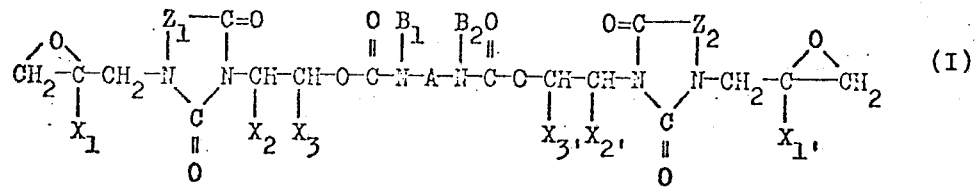 (I)

wherein A denotes a divalent aliphatic, cycloaliphatic, cycloaliphatic-aliphatic, araliphatic, aromatic or heterocyclic-aliphatic radical, $Z_1$ and $Z_2$ each represent a divalent radical of the formula

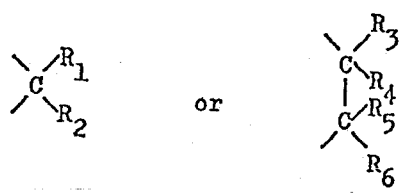

wherein $R_1$ and $R_2$ each denote a hydrogen atom or an aliphatic, cycloaliphatic, araliphatic or aromatic hydrocarbon radical, or wherein $R_1$ and $R_2$ together form a divalent aliphatic or cycloaliphatic hydrocarbon radical, $R_3$ and $R_5$ each denote a hydrogen atom or an aliphatic, cycloaliphatic, araliphatic or aromatic hydrocarbon radical and $R_4$ and $R_6$ each represent a hydrogen atom or an alkyl radical, $B_1$ and $B_2$ each denote a hydrogen atom, a glycidyl group or a β-methylglycidyl group, $X_1$ and $X_1'$ each represent a hydrogen atom or a methyl group, $X_2$ and $X_2'$ denote a hydrogen atom or the methyl radical, $X_3$ and $X_3'$ denote a hydrogen atom, a methyl radical, ethyl radical or phenyl radical, or $X_2$ and $X_3$, or $X_2'$ and $X_3'$, together denote a trimethylene radical or tetramethylene radical.

In the above formula (I), A preferably denotes an aliphatic, cycloaliphatic, cycloaliphatic-aliphatic, araliphatic or aromatic hydrocarbon radical or a N-heterocyclic aliphatic radical; $R_1$ and $R_2$ preferably denote hydrogen atoms or lower alkyl radicals with 1 to 4 carbon atoms or $R_1$ and $R_2$ together denote the tetramethylene or pentamethylene radical; $R_3$, $R_4$, $R_5$ and $R_6$ preferably denote hydrogen atoms or lower alkyl radicals with 1 to 4 carbon atoms and $B_1$ and $B_2$ preferably denote hydrogen atoms or glycidyl groups; $X_1$, $X_1'$, $X_2$ and $X_2'$ preferably denote hydrogen atoms and $X_3$ and $X_3'$ preferably each represent a hydrogen atom, a methyl group, an ethyl group or a phenyl group.

The new N,N'-diglycidyl compounds of the formula (I) are as a rule resins which are viscous to solid at room temperature and which can be processed with customary curing agents for epoxide resins, such as dicarboxylic acid anhydrides or polyamines, either as they are or in a mixture with reactive diluents, to give mouldings having good mechanical and electrical properties.

In addition to the casting resin field, preferred fields of use are above all applications as powder resins, such as fluidised bed powders and compression moulding powders.

The new polyepoxides of the formula (I) are manufactured according to methods which are in themselves known. A preferred process according to the invention for their manufacture is characterised in that in a compound of the formula

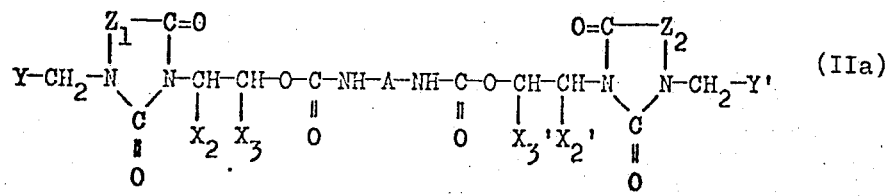 (IIa)

or of the formula

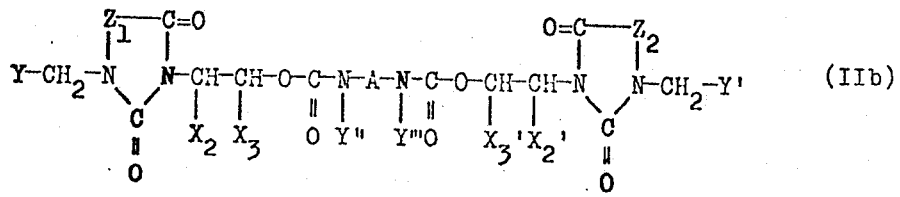 (IIb)

wherein A, $Z_1$, $Z_2$, $X_2$, $X_2'$, $X_3$ and $X_3'$ have the same meaning as in the formula (I) and the radicals Y, Y', Y'' and Y''' are radicals which can be converted into 1,2-epoxyethyl or 1-methyl-1,2-epoxyethyl radicals, these radicals are converted into expoxyethyl or 1-methyl-1,2-epoxyethyl radicals.

A radical Y, Y', Y'' or Y''' which can be converted into the 1,2-epoxyethyl radical or 1-methyl-1,2-epoxyethyl radical is above all a hydroxyhalogenoethyl radical which carries the functional groups on different carbon atoms, especially a 2-halogeno-1-hydroxyethyl radical or a 2-halogeno-1-hydroxy-1-methylethyl radical. Halogen atoms are here especially chlorine or bromine atoms. The reaction is carried out in the usual manner, above all in the presence of agents which split off hydrogen halide, such as strong alkalis, for example anhydrous sodium hydroxide or aqueous sodium hydroxide solution. However, it is also possible to employ other strongly alkaline reagents, such as potassium hydroxide, barium hydroxide, calcium hydroxide, sodium carbonate or potassium carbonate.

A further radical Y, Y', Y'', or Y''' which can be converted into the 1,2-epoxyethyl radical is, for example, the ethenyl radical which can be converted into the 1,2-epoxyethyl radical in a known manner, such as, above all, by reaction with hydrogen peroxide or peracids, for example peracetic, perbenzoic or monoperphthalic acid.

The starting substances of the formulae (IIa) or (IIb) are obtained in a manner which is in itself known. Thus it is possible, for example, to react a diurethane of the formula

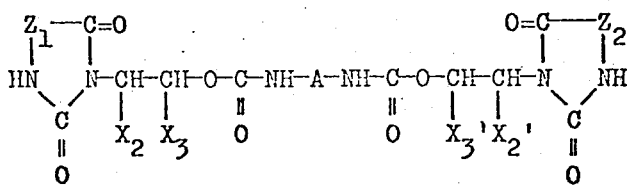

(III)

wherein A, $Z_1$, $Z_2$, $X_2$, $X_2'$, $x_3'$ and $X_3''$ have the same meaning as in the formula (I), with a compound of the formula $Y-CH_2-Hal$, wherein Hal represents a hydrogen atom and Y has the abovementioned meaning. Preferably, the compound of the formula (III) is reacted with an epihalogenohydrin or β-methylepihalogenohydrin, above all epichlorohydrin or β-methylepichlorohydrin, in the presence of a catalyst, such as especially a tertiary amine, a quaternary ammonium base or a quaternary ammonium salt. Suitable catalysts for the addition of epichlorohydrin or β-methylepichlorohydrin are above all tertiary amines, such as triethylamine, tri-n-propylamine, benzyldimethylamine, N,N'-dimethylaniline and triethanolamine; quaternary ammonium bases, such as benzyltrimethylammonium hydroxide; quaternary ammonium salts such as tetramethylammonium chloride, tetraethylammonium chloride, benzyltrimethylammonium chloride, benzyltrimethylammonium acetate and methyltriethylammonium chloride; hydrazines having a tertiary nitrogen atom, such as 1,1-dimethylhydrazine, which can also be employed in the quaternised form; alkali halides, such as lithium chloride, potassium chloride and sodium chloride, bromide or fluoride; also ion exchange resins with tertiary or quaternary amino groups, and also ion exchangers with acid amide groups. Basic impurities which can occur in technical commercially available forms of the starting compounds can also act as catalysts. In such cases it is not necessary especially to add a catalyst.

Depending on the molar ratio of the compound of the formula $Y-CH_2-Hal$ to the diurethane of the formula (III), and depending on the radical A, 2 to 4 mols of the compound $Y-CH_2-Hal$ are added to 1 mol of diurethane. The NH groups present in the heterocyclic ring in general react more easily than the active hydrogens of the urethane groups, so that when using approximately 2 mols of compound $Y-CH_2-Hal$ per 1 mol of diurethane compounds, of the formula IIa are as a rule first produced. Compounds of the formula IIb are above all formed if a stoichiometric excess of the compound $Y-CH_2-Hal$ is employed and additionally the radical A is an aromatic radical or the urethane groups $-CO-NH-$ are directly bonded to aromatic rings.

A preferred embodiment of the process consists, for example, of reacting an epihalogenohydrin or β-methylepihalogenohydrin, preferably epichlorohydrin or β-methylepichlorohydrin, in the presence of a catalyst, such as preferably a tertiary amine, a quaternary ammonium base or a quaternary ammonium salt, with a diurethane of the formula (III), and in a second stage treating the resulting product containing halogenohydrin groups with agents which split off hydrogen halide. In these reactions, the procedure described above is followed, and the compounds mentioned above can be used as catalysts for the addition of epihalogenohydrin or β-methylepihalogenohydrin or for the dehydrohalogenation of the abovementioned compounds. Particularly good yields are obtained if an excess of epichlorohydrin or β-methylepichlorohydrin is employed. During the first reaction, before the addition of alkali, a partial epoxidation of dichlorohydrin or of the β-methyldichlorohydrin of the diurethane (III) already occurs. The epichlorohydrin or β-methylepichlorohydrin which act as hydrogen chloride acceptors have then been partially converted into glycerine-dichlorohydrin or into β-methylglycerine-dichlorohydrin.

The symmetrical diurethanes of the formula (III) can be manufactured by addition of 1 mol of a diisocyanate of the formula $$O=C=N-A-N=C=O \quad (IV)$$

to 2 mols of a N-heterocyclic monoalcohol of the formula

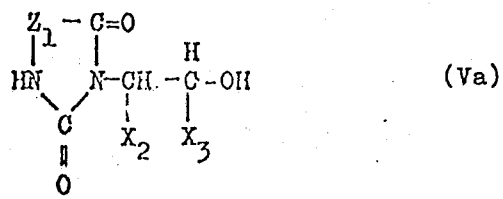

(Va)

or of the formula

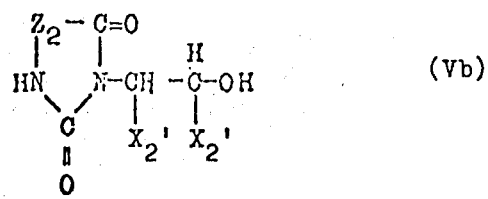

(Vb)

Diurethanes of the formula (III) of unsymmetrical structure can be obtained, for example, by first adding 1 mol of a diisocyanate (IV) to 1 mol of a heterocyclic monoalcohol of the formula (Va) and adding the resulting intermediate product, in a second stage, to 1 mol of a heterocyclic monoalcohol (Vb) which is different from the monoalcohol (Va).

The addition reaction is as a rule carried out at elevated temperature, for example at 60°–200°C, with exclusion of atmospheric moisture, and appropriately in the absence of solvents.

Possible diisocyanates of the formula (IV) are those of the aliphatic, cycloaliphatic, araliphatic, aromatic and heterocyclic-aliphatic series.

The following may be mentioned as diisocyanates of the aliphatic, cycloaliphatic and araliphatic series: ethylenediisocyanate, trimethylenediisocyanate, tetramethylenediisocyanate, hexamethylenediisocyanate, decamethylenediisocyanate, 2,2,4- and 2,4,4-trimethylhexamethylenediisocyanate or their technical mixtures; diisocyanates of the formula OCN-Y-NCO wherein Y denotes the hydrocarbon radical of a dimerised fatty alcohol which is hydrogenated if appropriate; cyclopentylene-1,3-diisocyanate, cyclohexylene-1,4-, -1,3-or -1,2-diisocyanate, hexahydrotoluylene-2,4- or -2,6-diisocyanate, 3,5,5-trimethyl-3-isocyanatomethyl-cyclohexane-1-isocyanate (= "isophorone-diisocyanate"); dicyclohexylmethane-4,4'-diisocyanate; o-, m- and p-xylylene-α,α'-diisocyanate.

As diisocyanates of the aromatic series there may be mentioned: toluylene-2,4-diisocyanate, toluylene-2,6-diisocyanate or their technical mixtures; diphenylmethane-4,4'-diisocyanate, naphthalene-1,5-diisocyanate, 3,3'-dimethyl-4,4'-diisocyanate, 3,3'-dimethyl-biphenyl-4,4'-diisocyanate, 3,3'-dimethoxy-4,4'-diphenyldiisocyanate, 3,3'-dichloro-diphenyl-4,4'-diisocyanate, 4,4'-diphenyldiisocyanate, diphenyldimethylmethane-4,4'-diisocyanate, p,p'-dibenzyl-diisocyanate and phenylene-1,4-diisocyanate; phenylene-1,3-diisocyanate and 2,3,5,6-tetramethyl-p-phenylene-diisocyanate; and the uretdione-diisocyanates obtainable by dimerisation of aromatic diisocyanates, such as, for example, of 2,4-toluylenediisocyanate, for example 1,3-bis-(4'-methyl-3'-isocyanato-phenyl-)-uretdione of the formula

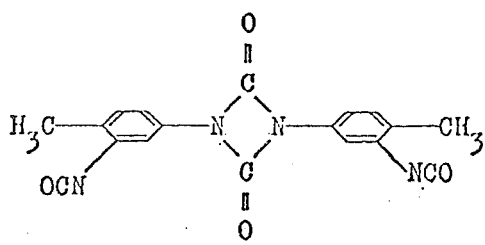

N,N'-di-(4-methyl-3-isocyanato-phenyl)-urea.

As diisocyanates of the heterocyclic-aliphatic series. there may be mentioned: 1,3-di-(γ-isocyanatopropyl)-hydantoin, 1,3-di(γ-isocyanatopropyl)-5-methyl-hydantoin, 1,3-di-(γ-isocyanatopropyl)-5,5-dimethyl-hydantoin, 1,3-di-(γ-isocyanatopropyl)-5-methyl-5-ethyl-hydantoin, 1,3-di-(γ-isocyanatopropyl)-5-ethyl-hydantoin, 1,3-di-(γ-isocyanatopropyl)-5-propyl-hydantoin, 1,3-di-(γ-isocyanatopropyl)-5-isopropyl-hydantoin, 1,3-di-(γ-isocyanatopropyl)-1,3-diazaspiro-(4.4)-nonane-2,4-dione and 1,3-di-(γ-isocyanatopropyl)-1,3-diaza-spiro-(4.5)-decane-2,4-dione, 1,3-di-(γ-isocyanatopropyl)-5,5-dimethyl-5,6-dihydrouracil and 1,3-di-(γ-isocyanatopropyl)-6-methyl-5,6-dihydrouracil; 1,1'-methylene-bis-(3γ-isocyanatopropylhydantoin); 1,1'-methylene-bis-(3-γ-isocyanatopropyl-5,5-dimethyl-hydantoin); 1,1'-methylene-bis-(3-γ-isocyanatopropyl-5-methyl-5-ethylhydantoin); bis-(1'-γ-isocyanatopropylhydantoinyl-3')-methane; 1,2-bis-(1'-γ-isocyanatopropyl-5',5'-dimethylhydantoinyl-3')-ethane; 1,4-bis-(1'-γ-isocyanatopropyl-5'-methyl-5'-ethyl-hydantoinyl-3')-butane; 1,6-bis-(1'-γ-isocyanatopropyl-5'-isopropylhydantoinyl-3')-hexane; 1,12-bis-(1'-γ-isocyanatopropyl-5',5'-pentamethylenehydantoinyl-3')-dodecane and β, β'-bis-(1'-γ-isocyanatopropyl-5',5'-dimethylhydantoinyl-3')-diethyl-ether.

The monalcohols of the formulae (Va) and (Vb) are obtained in a known manner by reacting 1 mol of a mononuclear N-heterocyclic compound of the general formula

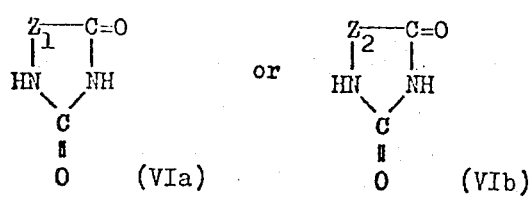

wherein $Z_1$ and $Z_2$ have the same meaning as in the formula (I), with 1 mol of a monoepoxide of the formula

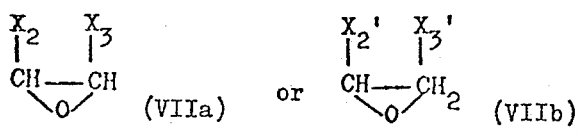

wherein $X_2$, $X_2'$, $X_3$ and $X_3'$ have the same meaning as in the formula (I), in the presence of a suitable catalyst.

In the reaction of hydantoins and dihydrouracils with a monoepoxide of the formula (VIIa) or VIIb), the acid NH group in position 3 of the ring first reacts. It is therefore possible to react the more strongly acid NH group substantially quantitatively with the monoepoxide before the more weakly acid or practically neutral NH group has reacted significantly. If therefore the reaction which leads to the monohydroxy compound is interrupted at the right moment (testing for the consumption of about 1 mol of monoepoxide per mol of the N-heterocyclic compound (VIa) or (VIb)), a compound of the formula (Va) or (Vb) is obtained as the main product.

The addition of a monoepoxide to the NH group in the 3-position of the N-heterocyclic compound of the formula (VIa) or (VIb) can be carried out in the presence of either acid or alkaline catalysts, a slight stoichiometric excess of the monoepoxide being employed as a rule.

Preferably, alkaline catalysts such as tetraethylammonium chloride or tertiary amines, are used in the manufacture of monoalcohols of the formulae (Va) or (Vb). However, alkali halides, such as lithium chloride or sodium chloride, can also be used successfully for this addition reaction; the reaction also takes place wihout catalysts.

The mononuclear N-heterocyclic compounds of the formulae (VIa) or (VIb) used for the manufacutre of the alkeneoxide addition products of the formulae (Va) or (Vb) respectively are above all hydantoin, hydantoin derivatives, dihydrouracil and dihydrouracil derivatives.

Hydantoin and its preferred derivatives correspond to the general formula

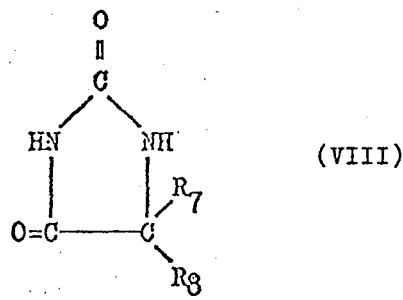

(VIII)

wherein $R_7$ and $R_8$ each denote a hydrogen atom or a lower alkyl radical with 1 to 4 carbon atoms, or wherein $R_7$ and $R_8$ together form a tetramethylene or pentamethylene radical. Hydantoin, 5-methylhydantoin, 5-methyl-5-ethylhydantoin, 5-n-propylhydantoin, 5-isopropyl-hydantoin, 1,3-diazaspiro(4.5)-decane-2,4-dione, 1,3-diazaspiro(4.4)-nonane-2,4-dione and preferably 5,5-dimethyl-hydantoin may be mentioned.

Dihydrouracil (=2,4-dioxo-hexahydropyrimidine) and its preferred derivatives correspond to the general formula

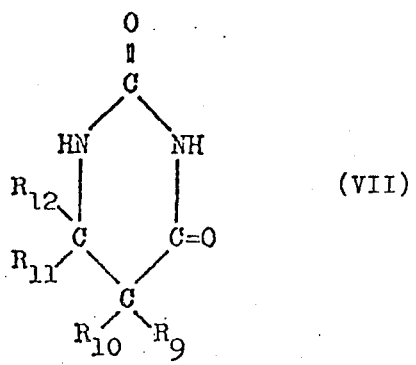

(VII)

wherein $R_9$ and $R_{10}$ both denote a hydrogen atom or identical or different alkyl radicals, preferably alkyl radicals with 1 to 4 carbon atoms, and $R_{11}$ and $R_{12}$ independently of one another each denote a hydrogen atom or an alkyl radical.

Preferably, in the above formula, the two radicals $R_7$ and $R_8$ denote methyl groups, $R_9$ denotes a hydrogen atom or a lower alkyl radical with 1 to 4 carbon atoms and $R_{10}$ denotes a hydrogen atom. 5,6-Dihydrouracil, 5,5-dimethyl-5,6-dihydrouracil (2,4-dioxo-5,5-dimethylhexahydropyrimidine) and 5,5-dimethyl-6-isopropyl-5,6-dihydrouracil (2,4-dioxo-5,5-dimethyl-6-isopropylhexahydropyrimidine) may be mentioned.

As monoepoxides of the formulae (VIIa) or (VIIb) which are added onto the N-heterocyclic compounds of the formulae (VIa) or (VIb) respectively to form the N-heterocyclic monohydroxy compounds of the formulae (Va) or (Vb) respectively, there may be mentioned: ethylene oxide (ethene oxide), propylene oxide (propene oxide), 1,2-butene oxide, 2,3-butene oxide, styrene oxide, 1,2-cyclopentene oxide and 1,2-cyclohexene oxide.

A preferred sub-category of N-heterocyclic monohydroxy compounds which are employed as starting substances hence correspond to the formula

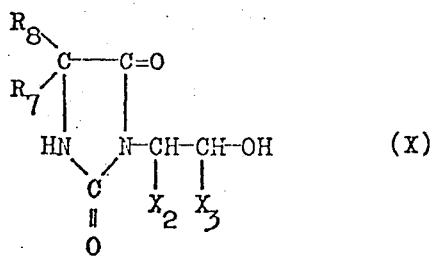

(X)

wherein $X_2$ and $X_3$ have the same meaning as in the formula (I) and wherein $R_7$ and $R_8$ have the same meaning as in the formula (VIII). 3-(2'-Hydroxy-ethyl)-5,5-dimethylhydantoin, 3-(2'-hydroxy-n-propyl)-5,5-dimethylhydantoin, 3-(2'-hydroxy-n-butyl)-5,5-dimethylhydantoin, 3-(2'-hydroxy-2'-phenylethyl)-5,5-dimethylhydantoin, 3-(2'-hydroxy-n-propyl)-5,5-tetramethylene-hydantoin and 3-(2'-hydroxy-1,2-tetramethylene)-5,5-dimethylhydantoin may be mentioned.

A further preferred sub-category of N-heterocyclic monohydroxy compounds which are employed as starting substances correspond to the formula

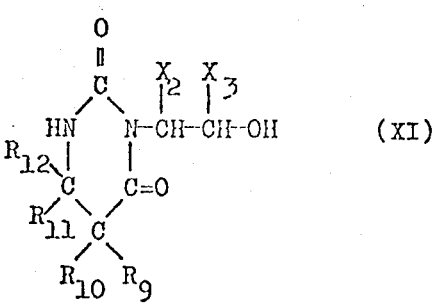

(XI)

wherein $X_2$ and $X_3$ have the same meaning as in the formula (I) and wherein $R_9$, $R_{10}$, $R_{11}$ and $R_{12}$ have the same meaning as in the formula (IX). 3-(2'-Hydroxy-ethyl)-5,5-dimethyl-6-isopropyl-5,6-dihydrouracil, 3-(2'-hydroxy-n-propyl)-5,5-dimethyl-6-isopropyl-5,6-dihydrouracil, and 3-(2'-hydroxy-2'-phenyl)-5,5-dimethyl-6-isopropyl-5,5-dihydrouracil, may be mentioned.

The new polyglycidyl compounds of the formula (I), according to the invention, react with the customary curing agents for polyepoxide compounds and can therefore be crosslinked or cured by addition of such curing agents, analogously to other polyfunctional epoxide compounds or epoxide resins. Basic or acid compounds can be used as such curing agents.

As suitable curing agents there may, for example, be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino-3-methyl-cyclohexyl)-methane, 3,5,-5-trimethyl-3-(aminomethyl)-cyclohexylamine ("isophoronediame"), Mannich bases, such as 2,4,6-tris-(dimethylaminomethyl)-phenol; m- phenylenediamine, p-phenylenediamine, bis-(4-aminophenyl)-methane, bis-(4-aminophenyl)-sulphone and m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess, and polyepoxides, such as diomethanepolyglycidyl-ethers; ketimines, for example from acetone or methyl ethyl ketone and bis(p-amino-pehnyl)-methane; adducts of monophenols or polyphenols and polyamines; polyamides, especially those from aliphatic polyamines, such as diethylenetriamine or triethylenetetramine, and dimerised or trimerised unsaturated fatty acids, such as dimerised linseed oil fatty acid; polymeric polysulphides dicyandiamide, aniline-formaldehyde resins, polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$ complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, methyl-3,6-endomethylene-$\Delta^4$-tetrahydrophthalic anhydride (= methylnadic anhydride), 3,4,5,6,7,7-hexachloro-3,6-endomethylene-$\Delta^4$-tetrahydrophthalic anhydride, succinic anhydride, adipic anhydride, azelaic anhydride, sebacic anhydride, maleic anhydride, dodecenyl-succinic anhydride; pyromellitic dianhydride or mixtures of such anhydrides.

Curing accelerators can furthermore be employed in the curing reaction; when using polyamides, dicyandiamide, polymeric polysulphides or polycarboxylic acid anhydrides as curing agents, suitable accelerators, are, for example, tertiary amines, their salts or quaternary ammonium compounds, for example 2,4,6-tris-(dimethylaminomethyl)-phenol, benzyldimethylamine, 2-ethyl-4-methyl-imidazole, 4-amino-pyridine and triamylammonium phenolate, and also alkali metal alcoholates, such as, for example, sodium hexanetriolate. In the amine curing reaction, monophenols or polyphenols, such as phenol or diomethane, salicylic acid or thiocyanates, ccan for example be employed as accelerators, The term "curing" as used here denotes the conversion of the abovementioned polyepoxides into insoluble and infusible, crosslinked products, and in particular, as a rule, with simultaneous shaping to give mouldings, such as castings, pressings or laminates and the like, or to give "sheet-like structures," such as coatings, coverings, lacquer films or adhesive bonds.

Depending on the choice of the curing agent, the curing reaction can be carried out at room temperature, (18°-25°C) or at elevated temperature (for example 50°-180°C).

The curing can, if desired, also be carried out in 2 stages, by first prematurely stopping the curing reaction or carrying out the first stage at only moderately elevated temperature, whereby a still fusible and soluble, curable precondensate (a so-called "B-stage") is obtained from the epoxide component and the curing agent component. Such a precondensate can, for example, be used for the manufacture of "Prepregs," compression moulding compositions or sintering powders.

A further subject of the present invention are therefore curable mixtures which are suitable or the manufacture of mouldings, including sheet-like structures, and which contain the polyglycidyl compounds according to the invention, optionally together with other polyepoxide compounds and also curing agents for epoxide resins, such as polyamines or polycarboxylic acid anhydrides.

The polyepoxides according to the invention or their mixtures with other polyepoxide compounds and/or curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flame-proofing substances and mould release agents.

As extenders, reinforcing agents, fillers and pigments which can be employed in the curable mixtures according to the invention there may, for example, be mentioned: coal tar, bitumen, glass fibres, boron fibres, carbon fibres, asbestos fibres, natural and synthetic textile fibres, such as polyester fibres, polyamide fibres and polyacrylonitrile fibres; polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel, lithopone; baryte, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monethyl ether and monobutyl ether.

As plasticisers for modifying the curable mixtures, dibutyl phthalate, dioctyl phthalate and dinonyl phthalate, tricresyl phosphate, trixylenyl phosphate and also polypropylene glycols can, for example, be employed.

As flow control agents when employing the curable mixtures, especially in surface protection, silicones, cellulose acetobutyrate, polyvinylbutyral, waxes, stearates and the like (which in part are also used as mould release agents) may, for example, be added.

Particularly for use in the lacquer field, the polyepoxide compounds according to the invention can furthermore be partially esterified in a known manner with carboxylic acids such as, in particular, higher unsaturated fatty acids. It is furthermore possible to add other curable synthetic resins, for example phenoplasts or aminoplasts, to such lacquer resin formulations.

The curable mixtures according to the invention can be manufactured in the usual manner, with the aid of known mixing equipment (stirrers, kneaders, rolls and the like).

The curable epoxide resin mixtures according to the invention are above all employed in the fields of surface protection, the electrical industry, laminating processes and the building industry. They can be used in a formulation suited in each case to the special end use, in the unfilled or filled state, optionally in the form of solutions or emulsions, as paints, lacquers, compression moulding compositions, sintering powders, dipping resins, casting resins, injection moulding formulations, impregnating resins and binders, adhesives, tool resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as to the millilitre to the gram.

In order to determine the mechanical and electrical properties of the curable mixtures described in the examples which follow, sheets of size 92 × 41 × 12 mm were manufactured for determining the flexural strength, deflection, impact strength and water absorption. The test specimens, (60 × 10 × 4 mm) for determining the water absorption and for the flexural test

| Found: | Calculated: |
|---|---|
| 6.3% H | 6.27% H |
| 23.6% O | 23.42% O |

The proton-magnetic resonance spectrum (60 Mc-HNMR, recorded in CDCl$_3$, against tetramethylsilane (TMS) as the internal standard) shows, through the presence of, inter alia, the following signals, that the product essentially has the following formula:

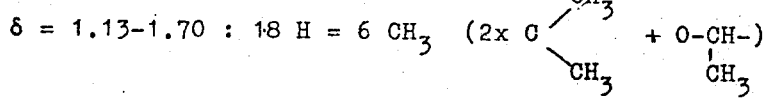

$\delta = 2.15: 3\ H =$  1 CH$_3$ group bonded to the aromatic ring
$\delta = 3.60$
$\delta = 3.80-4.3$  multiplets: 6H (N-CH$_2$, -CH$_2$-O)

Structural formula

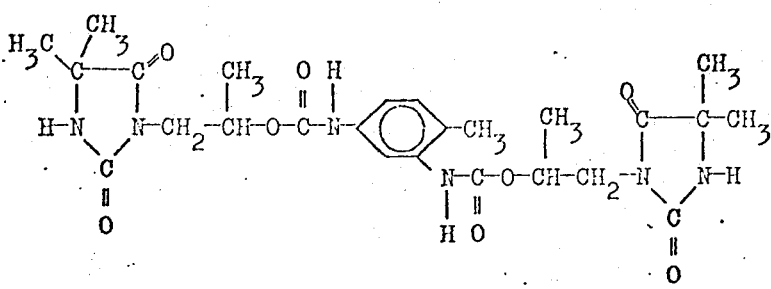

and impact test (VSM 77,103 and VSM 77,105 respectively) were machined from the sheets.

For determining the heat distortion point according to Martens (DIN 53,458), test specimens of size 120 × 15 × 10 mm were cast in each case.

To test the arcing resistance and tracking resistance (VDE 0303), sheets of size 120 × 120 × 4 mm were cast.

A. Manufacture of the Starting Substances

1. Diurethane from 1 mol of toluylene-2,4-diisocyanate and 2 mols of 3-(2'-hydroxy-n-propyl)-5,5-dimethylhydantoin 372.4 g of 3-(2'-hydroxy-n-propyl)-5,5-dimethylhydantoin (2 mols) are mixed with 174.2 g of toluylene-2,4-diisocyanate (1 mol) in a dry glass flask equipped with a stirrer, thermometer and reflux condenser, and the resulting paste is heated to 90°C whilst stirring. The reaction becomes exothermic and after removal of the heating bath the temperature rises to 115°–120°C. After the exothermic effect has subsided, the mixture is stirred for a further hour at 160°C. The resulting light brown clear melt is poured out onto a metal sheet to cool. After cooling, the product is broken up and powdered. A light ochre-coloured powder which softens at 116°C (Kofler) is obtained. Elementary analysis shows:

2. Diurethane from 1 mol fo "isophorone diisocyanate" and 2 mols of 3-(2'-hydroxy-n-propyl)-5,5-dimethylhydantoin 372 g of 3(2'-hydroxypropyl)-5,5-dimethylhydantoin (1.84 mols) are reacted with 201 g (0.909 mol) of 3,5,5-trimethyl-3-isocyanatomethyl-cyclohexane-1-isocyanate ("isophoronediisocyanate") analogously to Instruction A 1.

The reaction temperature is about 100°/130°C and the reaction time is 3 hours. The reaction takes place slightly exothermically. The adduct is worked up as described in Instruction A. 1.

The crude adduct, which melts at 125°–130°C, is obtained in quantitative yield. The product can be purified by recrystallisation. It consists of the diurethane of the formula

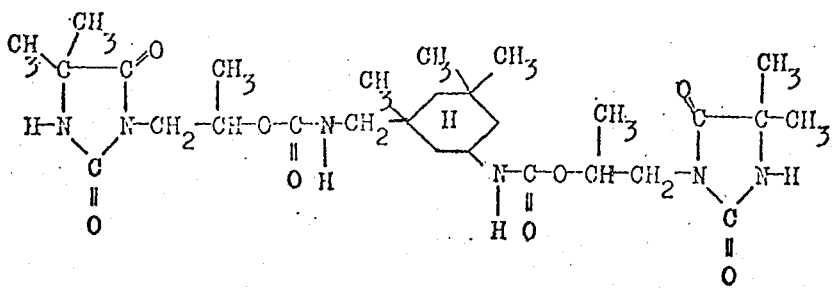

3. Diurethane from 1 mol of hexamethylenediisocyanate and 2 mols of 3-(2'-hydroxyethyl)-5,5-dimethyl-6-isopropyl-5,6-dihydrouracil.

10.2 g (0.0447 mol) of 3-(2'-hydroxy-ethyl)-5,5-dimethyl-6-isopropyl-5,6-dihydrouracil (melting point 129.4°–130.4°C) and 3.76 g of 1,6-hexamethylenediisocyanate (0.02235 mol) are stirred together at 145°C bath temperature to give a homogeneous, clear, colourless melt. In the course thereof, the internal temperature settles at 128°–130°C. After the two and a half hours' reaction, the addition is complete and the product obtained in quantitative yield is cooled to room temperature. A brittle glass results, which can

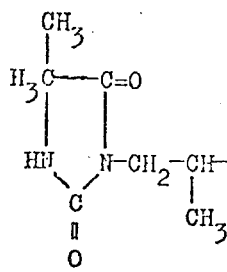 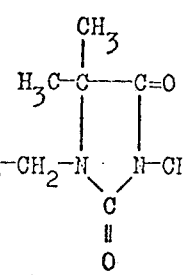 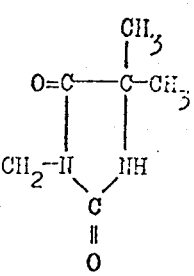

easily be ground to give a colourless powder of the fineness of dust. The product has a melting point of 58.8°C. The proton-magnetic resonance spectrum (60 Mc H-NMR recorded in deuterodimethylsulphoxide, against tetramethylsilane as the internal standard) shows inter alia through the presence of the following signals that the product has the structure shown below:

$\delta = 0.55 - 1.35$ 8 methyl groups
$\delta = 1.7 - 2.2$ 4 methylene groups
$\delta = 3.0$
                          6 methylene groups, activated
$\delta = 4.0$
$\delta = 6.95$                     2 N-H groups
$\delta = 8.0$                       2 N-H groups The product essentially consists of the diurethane of the formula

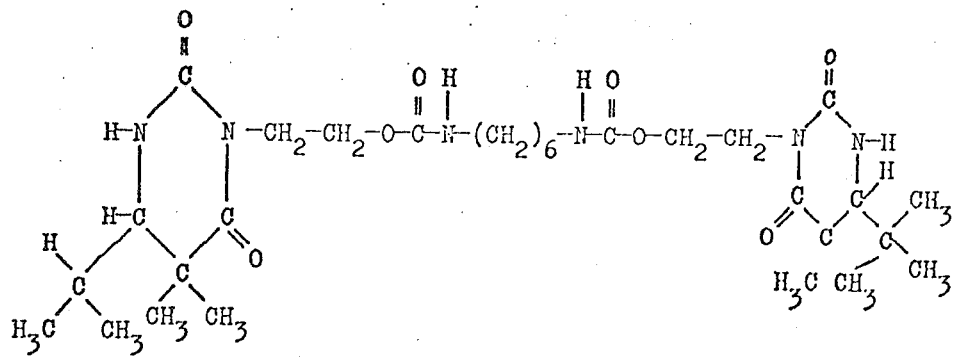

4. Diurethane from 1 mol of 1,3-(γ-diisocyanatopropyl)-5,5-dimethylhydantoin and 2 mols of 3-(2'-hydroxy-n-propyl)-5,5-dimethylhydantoin.

A mixture of 0.15 mol of 88.5% strength 1,3-(γ-diisocyanato-propyl)-5,5-dimethylhydantoin (49.9 g) and 0.3 mol of 3-(2'-hydroxy-n-propyl)-5,5-dimethylhydantoin (55.8 g) is stirred for 2 hours at 133°–137°C and is subsequently allowed to continue to react for about 4 hours at 157°–160 °C. The hot, clear melt is then poured out onto a metal sheet to cool. After cooling, the crude solid obtained in quantitative yield is finely powdered. It melts at 152°C (Mettler FP 51; 2°C/minute).

The product essentially consists of the diurethane of the formula:

5. diurethane from 1 mol of 4,4'-diisocyanatodiphenylmethane and 2 mols of 3-(2'-hydroxy-n-propyl)-5,5-pentamethylene-hydantoin.

A mixture of 25.2 g of 4,4'-diisocyanatodiphenylmethane (0.1 mol) and 45.3 g of 3-(2'-hydroxypropyl)-5,5-pentamethylenehydantoin (0.2 mol) is stirred for 4 hours at 190°–192°C; thereafter the clear melt is treated as described under A)4. A slightly coloured crystalline powder which melts at 177°C (Mettler FP 51; 2°C/minute) is obtained in quantitative yield. The product essentially consists of the diurethane of the formula

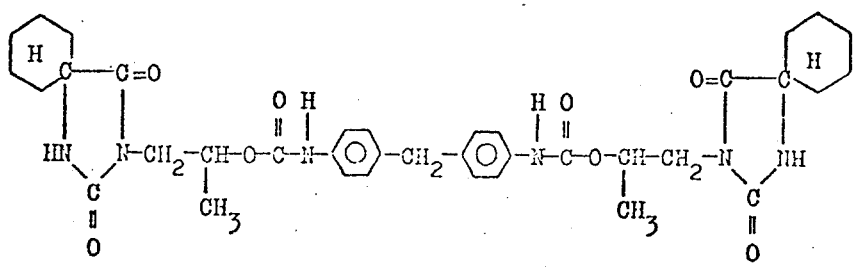

B. Manufacturing Examples

EXAMPLE 1

A mixture of 273.3 g (0.5 mol) of the diurethane manufactured according to Instruction A. 1. from 1 mol of toluylene-2,4-diisocyanate and 2 mols of 3-(2'-hydroxy-n-propyl)-5,5-dimethyl-hydantoin, 1,385 g of epichlorohydrin (15 mols) and 2.5 g of tetraethylammonium chloride is stirred for 45 minutes at 90°C. A slightly cloudy solution is thereby produced.

A vigorous circulatory distillation is now set up at 130°–140°C bath temperature by applying vacuum (60°–90 mm Hg) whilst stirring, in such a way that an internal temperature of 60°C results. When this circulatory distillation has been set up, 96.0 g of 50% strength aqueous sodium hydroxide solution are added dropwise over the course of 120 minutes whilst stirring vigorously. At the same time, the water present in the reaction mixture is continuously removed from the circulation and separated off.

After completion of the addition of the alkali solution, the distillation is continued until the last traces of water have been removed from the mixture; this requires about 20–30 minutes.

2,4-diisocyanate and 2 mols of 3-(2'-hydroxy-n-propyl)-5,5-dimethyl-hydantoin are treated with 1,925 g of epichlorohydrin (20.8 mols) and with 3.45 g of tetraethylammonium chloride, analogously to the description in Example 1. The dehydrohalogenation with 134.4 g of 50% strength sodidum hydroxide solution and the subsequent working-up also take place in accordance with Example 1.

267.4 g of a light brown, viscous clear resin are obtained (yield: 100% of theory) the resin having an epoxide content of 4.71 equivalents/kg (corresponding to 90.6% of theory); the total chlorine content is 2.5%. The product essentially consists of the tetraepoxide of the formula

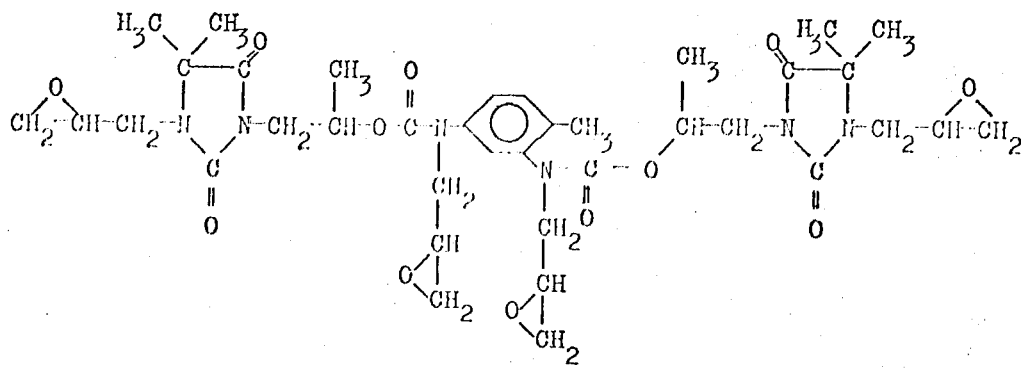

The mixture is now cooled to approx. 35°C and filtered to remove the sodium chloride produced during the reaction. The filter residue is washed with 100 ml of epichlorohydrin; to remove traces of sodium chloride and of catalyst, the combined epichlorohydrin solutions are extracted by shaking with 80 ml of water. After separating off the aqueous layer, the organic phase is concentrated on a rotary evaporator at 60°C under a slight vacuum. Thereafter 50 ml of water are added and the mixture is concentrated, and finally 50 ml of toluene are added and the concentration is completed. The product is then dried to constant weight at 65°C and 10.1 mm Hg.

325 g of a clear, highly viscous, light yellowish epoxide resin (yield: 99.1% of theory) are obtained. The product essentially consists of the diepoxide of the formula

EXAMPLE 3

405 g (0.68 mol) of the diurethane manufactured according to Instruction A, 2. from 1 mol of isophoronediisocyanate and 2 mols of 3-(2'-hydroxy-n-propyl)-5,5-dimethyl-hydantoin are treated with 1,575 g of epichlorohydrin (17 mols) and 3.4 g of tetraethylammonium chloride, as described in Example 1.

The dehydrohalogenation with 138 g of 50% strength aqueous sodium hydroxide solution and the working-up and isolation of the reaction product are also carried out in accordance with Example 1.

A solid, clear, brittle, light brown epoxide resin which has an epoxide content of 2.83 equivalents/kg (100% of theory) is obtained in 95.6% yield (459.0 g); the total chlorine content is 1.8%.

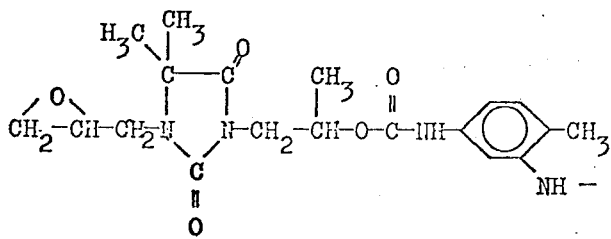

EXAMPLE 2

Tetraglycidylation 190 g (0.347 mol) of the diurethane manufactured according to Instruction A.1. from 1 mol of toluylene- The product essentially consists of the diepoxide of the following structure:

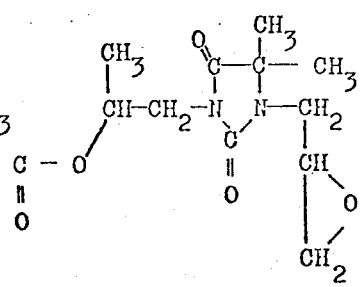

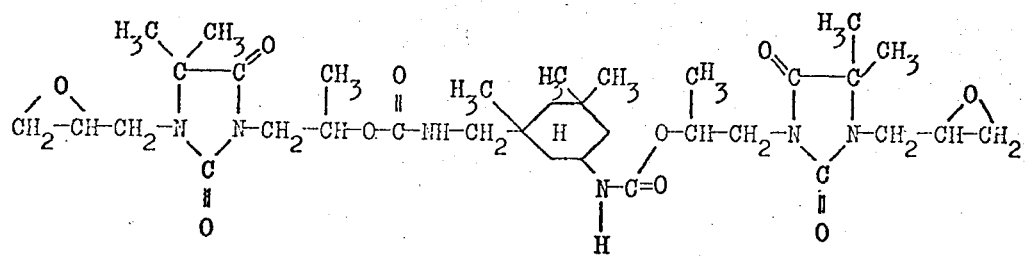

EXAMPLE 4

A solution of 12.5 g (0.02 mol) of the diurethane manufactured according to Instruction A. 3. from 1 mol of hexamethylenediisocyanate and 2 mols of 3-(2'-hydroxyethyl)-5,5-dimethyl-6-isopropyl-5,6-dihydrouracil in 111 g of epichlorohydrin (1.2 mols) is stirred with 0.1 g of tetramethylammonium chloride for 45 minutes under reflux.

Thereafter dehydrochalogenation is carried out with 4.0 g of 50% strength aqueous sodium hydroxide solution according to Example 1. Working-up also takes place analogously to the description in Example 1.

15 g (theory 14.8 g) of a pale yellow, clear, highly viscous resin having an epoxide content of 3.0 epoxide equivalents/kg are obtained. Accordingly, the product mainly consists of the diglycidyl compound of the formula 1, with 310.4 g of epichlorohydrin (3.355 mols) and 24.7 g of 50% strength aqueous sodium hydroxide solution (0.3087 mol), with the aid of 0.667 g off tetraethylammonium chloride. The entire reaction and the working-up of the batch take place in accordance with Example 1.

104 g of a yellow, clear, highly viscous resin (100% of theory) possessing 3.4 epoxide equivalents/kg are obtained. The product essentially consists of the diglycidyl compound of the following structure:

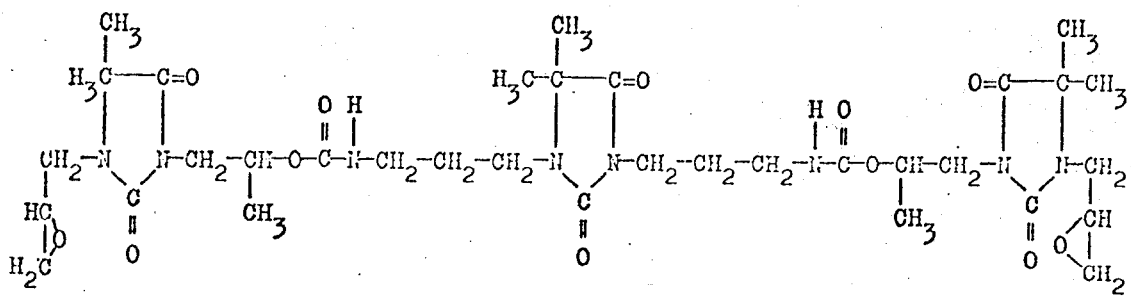

EXAMPLE 6

Analogously to Example 1, 61 g (0.0868 mol) of the crude diurethane manufactured according to Instruction A. 5. from 1 mol of 4,4'-diisocyanatodiphenylmethane and 2 mols of 3-(2'-hydroxy-n-propyl)-5,5-pentamethylenehydantoin are reacted with 201 g of epichlorohydrin (2.172 mols),

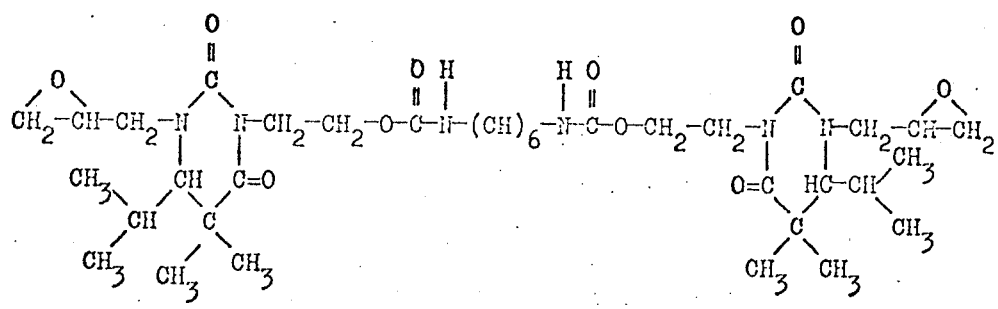

The product is contaminated with a trace of triglycidyl compound or tetraglycidyl compound.

EXAMPLE 5

89.5 g (0.1342 mol) of the crude diurethane manufactured according to Instruction A.A. from 1 mol of 1,3-(γ-diisocyanatopropyl)-5,5-dimethylhydantoin and 2 mols of 3-(2'-hydroxy-n-propyl)-5,5-dimethylhydantoin are treated, analogously to Example 0.4315 g of tetraethylammonium chloride and 15.98 g of 50% strength aqueous sodium hydroxide solution. The dehydrohalogenation and isolation of the product are also carried out in accordance with Example 1. A viscous resin possessing 2.34 epoxide equivalents/kg (99.8% of theory) is obtained in 79.9% yield. The product essentially consists of the diglycidyl compound of the following structure:

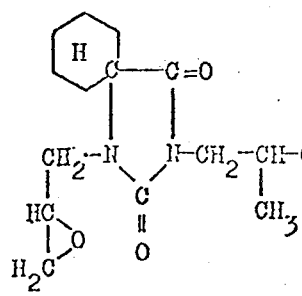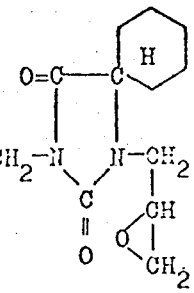

C. Examples of Uses

EXAMPLE I

A mixture of 66.5 g of the epoxide resin manufactured according to Example 1, having an epoxide content of 3.5 epoxide equivalents/kg, and 36.6 g of hexahydrophthalic anhydride is stirred at 75°C to give a homogeneous melt. The mixture is then poured into aluminium moulds pre-warmed to 80°C and is cured in accordance with the following cycle: 2 hours/80°C + 2 hours/120°C + 12 hours/150°C. Clear, transparent, light-coloured mouldings having the following properties are obtained:

| | |
|---|---|
| Flexural strength (VSM 77,103) | : 8.3 kp/mm² |
| Deflection (VSM 77,103) | : 2.0 mm |
| Impact strength (VSM 77,105) | : 11.3 cm.kp/cm² |
| Heat distortion point according to Martens (DIN 53,458) | : 99°C |

EXAMPLE II

Analogously to Example I, 106.2 g of the epoxide resin manufactured according to Example 2 (epoxide content: 4.71 equivalents/kg) are converted into mouldings by means of 73.3 g of hexahydrophthalic anhydride.

Clear, reddish-coloured castings are obtained, which show the following properties:

| | |
|---|---|
| Flexural strength (VSM 77,103) | : 11.3 kp/mm² |
| Deflection (VSM 77,103) | : 3.2 mm |
| Impact strength (VSM 77,105) | : 10.3 cm.kp/cm² |
| Heat distortion point according to Martens (DIN 53,458) | : 126°C |

EXAMPLE III 141 g of the epoxide resin manufactured according to Example 3, having an epoxide content of 2.83 epoxide equivalents/kg, are cured with 60 g of hexahydrophthalic anhydride at 90°C in an aluminium mould in 2 hours at 90°C + 13 hours at 150°C. The resulting clear moulding has good mechanical properties.

EXAMPLE IV

Two samples (series A and B) of each of the epoxide resins manufactured according to Example 1, 2 and 3 are mixed in a beaker with the equivalent amounts of hexahydrophthalic anhydride (series A) and isophoronediamine (series B) and cured for 16 hours at 140°C. The glass transition temperatures were measured on the samples:

| Epoxide resin, manufactured according to Example | Glass transition temperature (°C) | |
|---|---|---|
| | Series A | Series B |
| 1 | 127 | 149 |
| 2 | 162 | 162 |
| 3 | 160 | 171 |

We claim:
1. A binuclear N-heterocyclic polyglycidyl compound of the formula

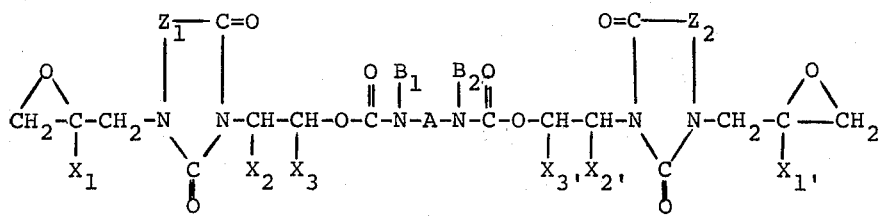

wherein A is tolylene, phenylene, alkylene containing 2 to 10 carbon atoms

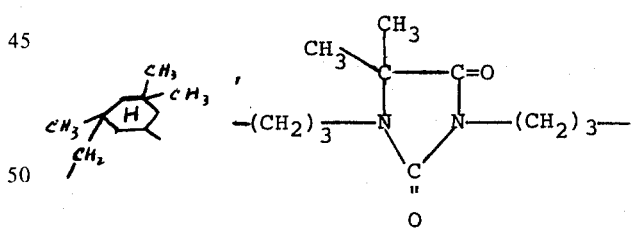

or

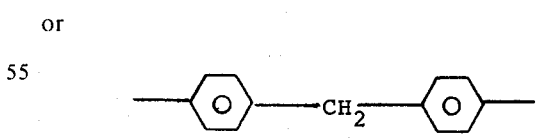

$Z_1$ and $Z_2$ are the same and each represents a divalent radical of the formula

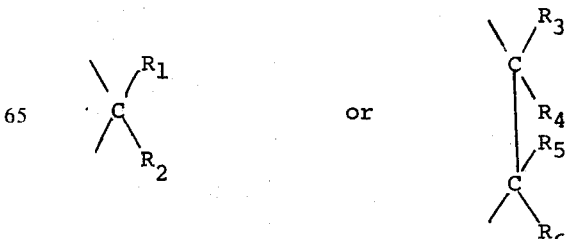

wherein each of $R_1$, $R_2$, $R_3$, $R_4$, $R_5$ and $R_6$ independently of one another is hydrogen or alkyl of 1 to 4 carbon atoms or wherein $R_1$ and $R_2$ together is tetramethylene or pentamethylene; $B_1$ and $B_2$ are the same and each is hydrogen, glycidyl, or β-methylglycidyl; $X_1$ and $X_1$ are the same and each represents hydrogen or methyl; $X_2$ and $X_2$ are the same and each represents hydrogen or methyl; $X_3$ and $X_3$ are the same and each represents hydrogen, methyl, ethyl, or phenyl or $X_2$ and $X_3$ and $X_2$ and $X_3$ together represent trimethylene or tetramethylene.

2. A binuclear N-heterocyclic polyglycidyl compound according to claim 1 where each of $Z_1$ and $Z_2$ is

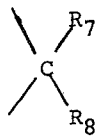

wherein each of $R_7$ and $R_8$ is hydrogen or lower alkyl of 1 to 4 carbon atoms, or $R_7$ and $R_8$ together is tetramethylene or pentamethylene.

3. A binuclear N-heterocyclic polyglycidyl compound according to claim 1 where each of $Z_1$ and $Z_2$ is

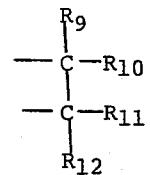

wherein each of $R_9$, $R_{10}$, $R_{11}$ and $R_{12}$ is hydrogen or lower alkyl of 1 to 4 carbon atoms.

4. The compound according to claim 1 of the formula

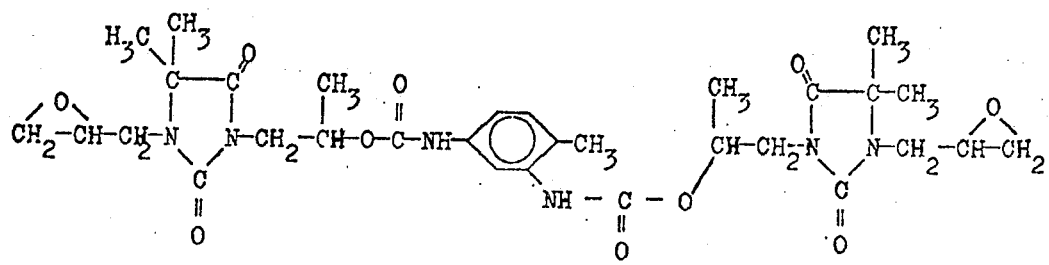

5. The compound according to claim 1, of the formula

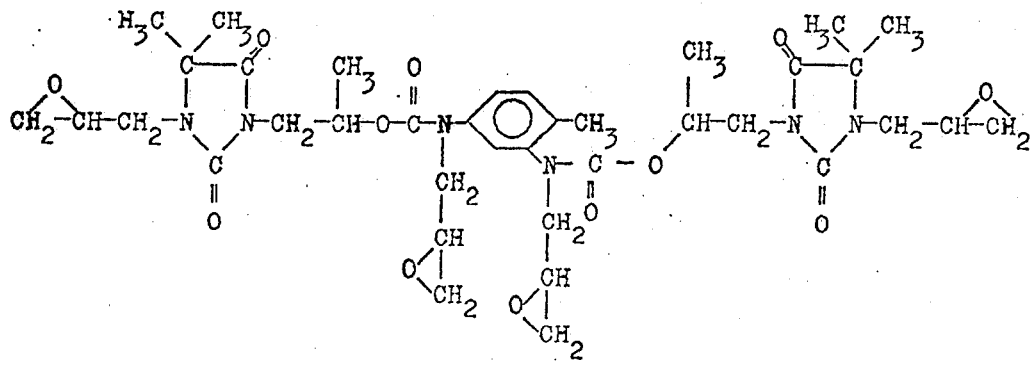

6. The compound according to claim 1, of the formula

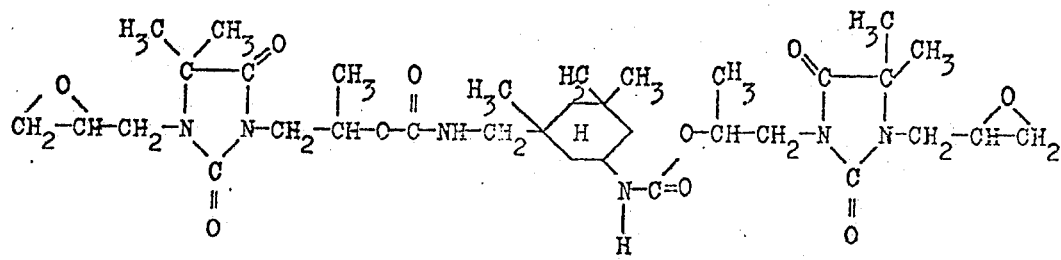

7. The compound according to claim 1 of the formula
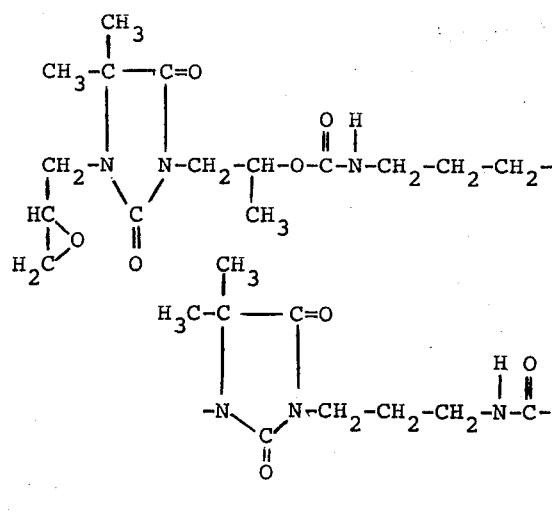
8. The compound according to claim 1, of the formula
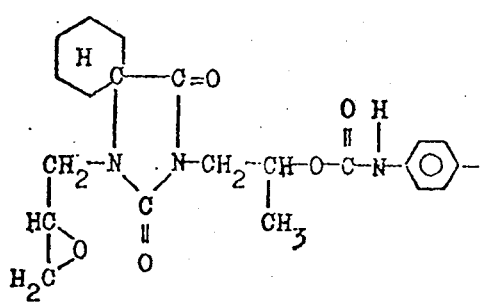
9. The compound according to claim 1, of the formula
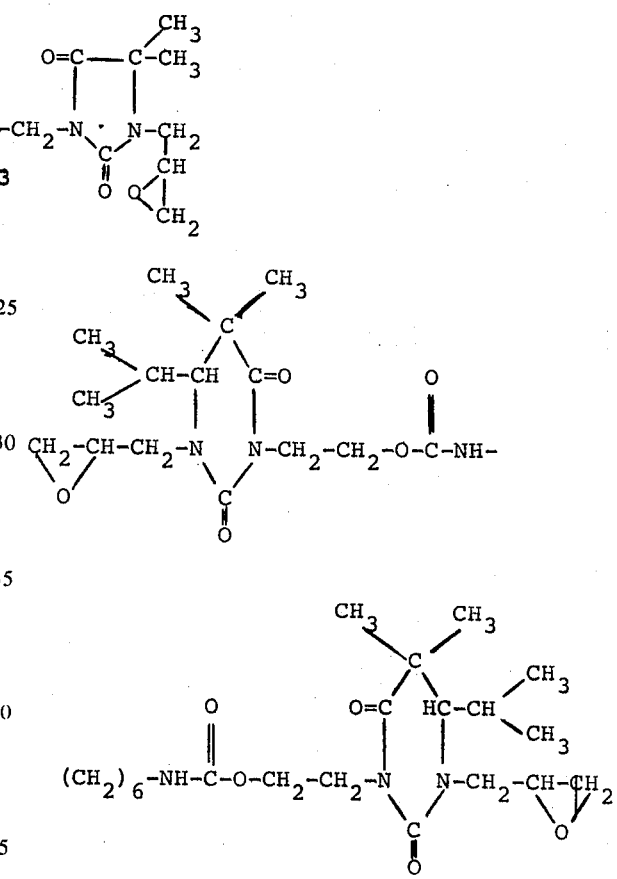
* * * * *